United States Patent
Carielli et al.

(10) Patent No.: US 11,288,104 B2
(45) Date of Patent: Mar. 29, 2022

(54) AUTOMATIC DYNAMIC OPERATING SYSTEM PROVISIONING

(71) Applicant: INTERNATIONAL BUSINESS MACHINES CORPORATION, Armonk, NY (US)

(72) Inventors: Thomas A. Carielli, Fishkill, NY (US); Judith Ann Viccica, Hopewell Junction, NY (US); Paola Bari, Poughkeepsie, NY (US); Eugene Ong, Hopewell Junction, NY (US); John Theos, Tuxedo Park, NY (US); Christopher Brian Van Wagner, Red Hook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 16/533,034

(22) Filed: Aug. 6, 2019

(65) Prior Publication Data
US 2021/0042164 A1    Feb. 11, 2021

(51) Int. Cl.
*G06F 9/46* (2006.01)
*G06F 9/50* (2006.01)
(Continued)

(52) U.S. Cl.
CPC ............ *G06F 9/5077* (2013.01); *G06F 3/067* (2013.01); *G06F 3/0644* (2013.01);
(Continued)

(58) Field of Classification Search
CPC ..................................................... G06F 9/5077
(Continued)

(56) References Cited

U.S. PATENT DOCUMENTS

| 6,282,712 B1* | 8/2001 | Davis | G06F 8/60 |
| | | | 704/8 |
| 7,761,538 B2* | 7/2010 | Lin | H04L 43/50 |
| | | | 709/220 |

(Continued)

OTHER PUBLICATIONS

Anonymous, "Method and System to Automatically Provision Test Environments Based on Dynamic Configurations," IP.com (IPCOM000247218D), Published Aug. 17, 2016. 3 pages.

(Continued)

*Primary Examiner* — Mehran Kamran
(74) *Attorney, Agent, or Firm* — Cantor Colburn LLP; Teddi Maranzano

(57) ABSTRACT

Automatically deploying a logical partition in a computer server is described. Deploying the logical partition includes receiving, by a processor, an address of storage associated with the logical partition. The method of deployment can further include creating, by the processor, on the storage, volume serials with a predetermined naming structure. Further, the method includes copying files associated with an operating system to the storage according to the volume serials created. The method further includes customizing configuration settings associated with the operating system according to predetermined values. The method further includes activating the logical partition and operating system using a base control program internal interface.

20 Claims, 5 Drawing Sheets

(51) Int. Cl.
*G06F 9/48* (2006.01)
*G06F 3/06* (2006.01)

(52) U.S. Cl.
CPC .......... *G06F 3/0665* (2013.01); *G06F 9/4881* (2013.01); *G06F 3/0607* (2013.01)

(58) Field of Classification Search
USPC ......................................................... 718/102
See application file for complete search history.

(56) References Cited

U.S. PATENT DOCUMENTS

| | | | | |
|---|---|---|---|---|
| 8,185,684 | B1* | 5/2012 | Naftel | G06F 9/45558 711/6 |
| 9,411,697 | B2* | 8/2016 | Aggarwal | G06F 11/2028 |
| 9,769,251 | B2* | 9/2017 | Jiang | H04L 67/34 |
| 10,059,342 | B2* | 8/2018 | Ricci | G01S 19/42 |
| 10,192,065 | B2* | 1/2019 | Iyer | G06F 3/0631 |
| 2008/0195622 | A1* | 8/2008 | Lelcuk | G06F 16/252 |
| 2009/0172470 | A1* | 7/2009 | Bobak | H04L 41/0654 714/16 |
| 2009/0228889 | A1* | 9/2009 | Yoshida | G06F 9/485 718/102 |
| 2010/0122248 | A1* | 5/2010 | Robinson | G06F 9/5077 718/1 |
| 2011/0083138 | A1* | 4/2011 | Sivasubramanian | G06F 16/217 719/328 |
| 2011/0099147 | A1* | 4/2011 | McAlister | G06F 11/2076 707/639 |
| 2011/0138383 | A1* | 6/2011 | Le | G06F 9/5077 718/1 |
| 2012/0005673 | A1* | 1/2012 | Cervantes | G06F 9/45558 718/1 |
| 2012/0072687 | A1* | 3/2012 | Hiraiwa | G06F 3/065 711/162 |
| 2012/0254861 | A1* | 10/2012 | Down, Jr. | G06F 8/63 718/1 |
| 2013/0132691 | A1* | 5/2013 | Banga | G06F 9/4406 711/162 |
| 2014/0040886 | A1* | 2/2014 | Coles | H04L 63/061 718/1 |
| 2015/0106806 | A1* | 4/2015 | Reddy | G06F 9/5077 718/1 |
| 2015/0154042 | A1* | 6/2015 | Katayama | G06F 9/45533 718/1 |
| 2015/0169329 | A1* | 6/2015 | Barrat | G06F 9/5077 713/2 |
| 2015/0186064 | A1* | 7/2015 | Chen | G06F 11/2069 711/162 |
| 2015/0334696 | A1* | 11/2015 | Gu | H04L 61/2015 718/1 |
| 2016/0055018 | A1* | 2/2016 | Usgaonkar | G06F 9/45554 718/1 |
| 2016/0092203 | A1* | 3/2016 | Filali-Adib | G06F 8/656 717/171 |
| 2017/0024224 | A1* | 1/2017 | Bakke | G06F 9/45558 |
| 2017/0139730 | A1* | 5/2017 | Cropper | G06F 9/45558 |
| 2018/0124152 | A1* | 5/2018 | Gao | G06F 3/0604 |
| 2018/0150237 | A1* | 5/2018 | Koo | G06F 12/02 |
| 2018/0267879 | A1* | 9/2018 | Tsuda | G06F 11/3409 |
| 2018/0293622 | A1* | 10/2018 | Tompkins | G06Q 30/0281 |
| 2018/0321979 | A1* | 11/2018 | Bahramshahry | G06F 9/505 |
| 2018/0365046 | A1* | 12/2018 | S S | G06F 9/4411 |
| 2019/0087116 | A1* | 3/2019 | Tsuda | G06F 3/0641 |
| 2019/0188047 | A1* | 6/2019 | Dao | G06F 11/301 |
| 2019/0250994 | A1* | 8/2019 | Saito | G06F 9/45533 |
| 2019/0266072 | A1* | 8/2019 | Ge | G06F 9/45558 |
| 2019/0318074 | A1* | 10/2019 | Ledwith | H04W 12/08 |
| 2020/0125537 | A1* | 4/2020 | Busick | H04L 41/0806 |
| 2020/0310854 | A1* | 10/2020 | McBrearty | G06F 3/0664 |

OTHER PUBLICATIONS

Anonymous, "Method to automatically detect machine type and provision the OS with a machine-specific profile," IP.com (IPCOM000198935D), Published Aug. 17, 2010. 3 pages.

IBM "OnDemand provisioning of Testsystems for SA z/OS development and test team," IP.com (IPCOM000175605D), Published Oct. 15, 2008. 5 pages.

IBM "Using IBM z/OS Provisioning Toolkit" Version 1, Release 1. Created Jan. 31, 2019. 154 pages.

* cited by examiner

AUTOMATIC DYNAMIC OPERATING SYSTEM PROVISIONING

BACKGROUND

The present invention generally relates to computer technology and, more specifically, to deploying and un-deploying a fully functioning instance of an operating system (OS) on a server computer.

Enterprise operations require operating systems, products, and software applications to be automatically built. In various cases, it can be critical for all the systems in the enterprise to be at the same operating system level and for each individual configuration type to be at the same product code level for proper functionality.

As part of a wide enterprise deployment process, system administrators add, in an unattended installation mode, new servers and new workstations to the network that do not have an operating system or software installed on them. Installing instances of operating system(s) on these computing devices can be a technical challenge.

SUMMARY

Automatically deploying a logical partition in a computer server is described. A method for deploying the logical partition includes receiving, by a processor, an address of storage associated with the logical partition. The method further includes creating, by the processor, on the storage, volume serials with a predetermined naming structure. Further, the method includes copying files associated with an operating system to the storage according to the volume serials created. The method further includes customizing configuration settings associated with the operating system according to predetermined values. The method further includes activating the logical partition and operating system using a base control program internal interface.

According to one or more embodiments of the present invention, a system includes a memory, and a processor communicatively coupled with the memory. The processor performs a method for configuring a computer server, which includes deploying a logical partition in the computer server. The method for deploying the logical partition includes receiving, by a processor, an address of storage associated with the logical partition. The method further includes creating, by the processor, on the storage, volume serials with a predetermined naming structure. Further, the method includes copying files associated with an operating system to the storage according to the volume serials created. The method further includes customizing configuration settings associated with the operating system according to predetermined values. The method further includes activating the logical partition and operating system using a base control program internal interface.

According to one or more embodiments of the present invention, a computer program product comprising a computer-readable memory that has computer-executable instructions stored thereupon, wherein the computer-executable instructions when executed by a processor cause the processor to perform a method for configuring a computer server, which includes deploying a logical partition in the computer server. The method for deploying the logical partition includes receiving, by a processor, an address of storage associated with the logical partition. The method further includes creating, by the processor, on the storage, volume serials with a predetermined naming structure. Further, the method includes copying files associated with an operating system to the storage according to the volume serials created. The method further includes customizing configuration settings associated with the operating system according to predetermined values. The method further includes activating the logical partition and operating system using a base control program internal interface.

The above-described features can also be provided at least by a system, a computer program product, and a machine, among other types of implementations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
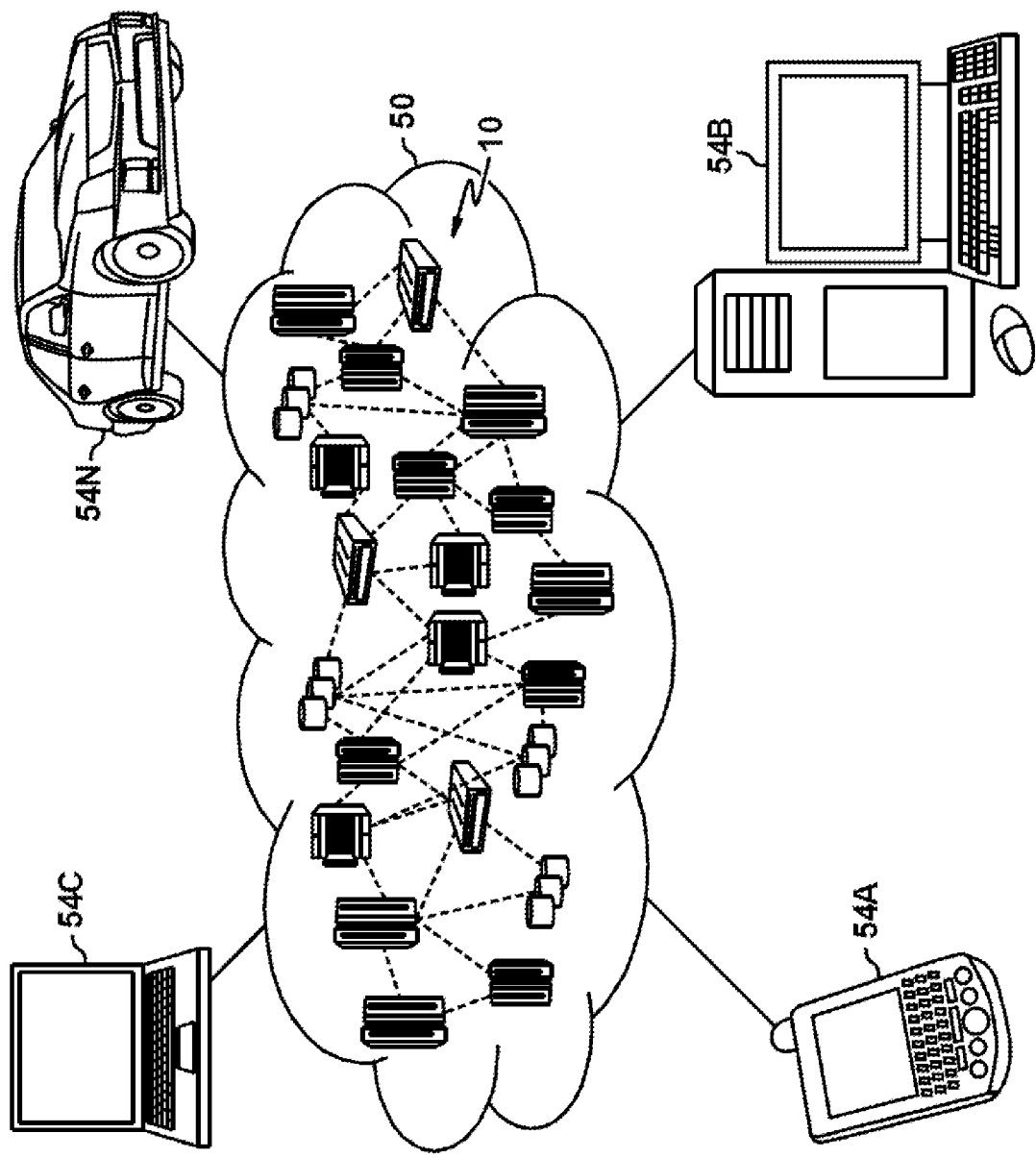
FIG. 1 depicts a cloud computing environment according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
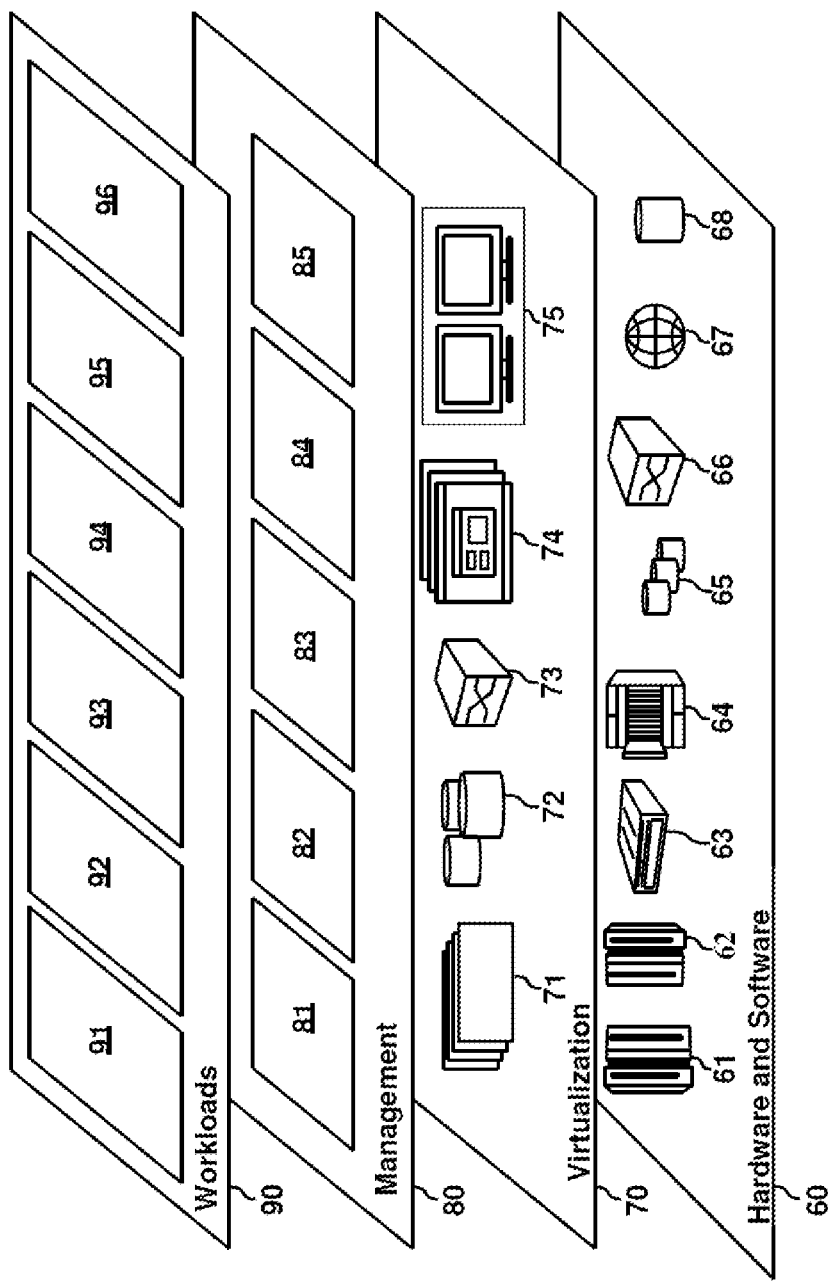
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and system maintenance 96.

Typically, configuring and deploying each of such computing systems is a lengthy and complicated process that is assigned to one or more administrators. For example, an administrator and support staff may spend many hours and days setting up and configuring a server farm for an organization. In one or more examples, an existing, already configured computing system may need to be reconfigured. The reconfiguration can take can be at least as complicated and lengthy as the initial deployment. For example, typical provisioning of a logical partition (LPAR) with an instance of z/OS® can take a few weeks long. Here, "provisioning" or "deploying" an instance of z/OS® includes configuring one or more services and packages, etc. that can make the operating system instance serviceable. It should be noted that although provisioning z/OS® is used as an example to describe one or more embodiments of the present invention herein, the technical features described herein are also applicable to provisioning other operating systems (OS).

One or more embodiments of the present invention facilitate quick deployment and un-deployment of a fully functioning instance of an OS. Multiple fully functional LPAR's with functioning middleware can be deployed and be ready for use in less than a day, for example, about four hours with active touch time from administrators of about 5 minutes. The technical solutions provided herein are scalable, limited by only the hardware capacity of storage and partition limits of the server/mainframe.

Figure 3:
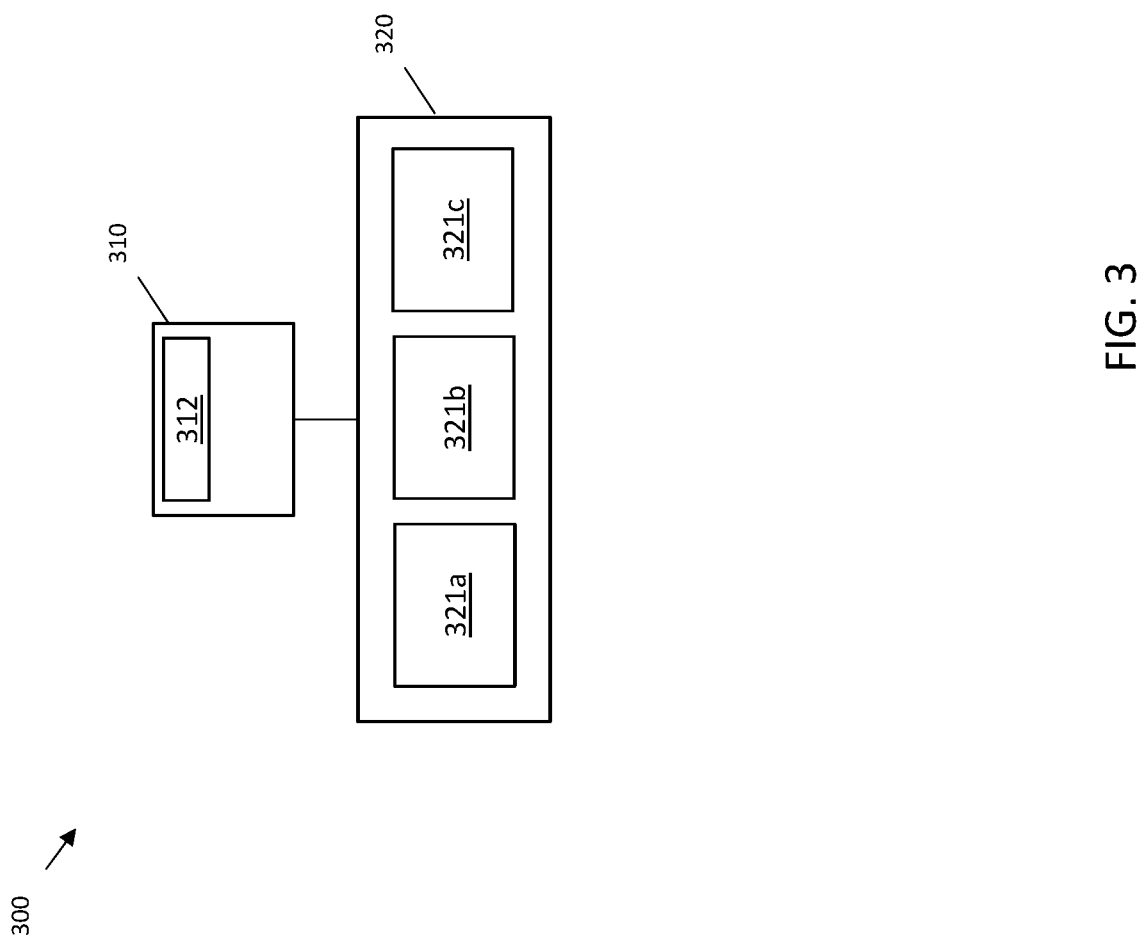
FIG. 3 depicts a block diagram of the operating system provisioning system according to one or more embodiments of the present invention.

FIG. 3 depicts a block diagram of the operating system provisioning system according to one or more embodiments of the present invention. The system 300 includes a server computer 320, such as a mainframe computer, or any other computing device. The server computer 320 can include one or more partitions 321a-c each including a copy of a respective OS. It is understood that although three partitions are shown in FIG. 3, in other embodiments of the present invention, the server computer 320 can include more or fewer number of partitions.

In one or more examples, the partitions 321a-c can be LPARs or their equivalent. A system administrator can assign one or more system processors for the exclusive use of an LPAR. Alternately, the administrator can allow all processors to be used on some or all LPARs 321a-c. Here, the system control functions (often known as microcode or firmware) provide a dispatcher to share the processors among the selected LPARs. The administrator can specify a maximum number of concurrent processors executing in each LPAR 321a-c. The administrator can also provide weightings for different LPARs; for example, specifying that LPAR1 321a should receive twice as much processor time as LPAR2 321b.

The OS in each LPAR 321a-c executes an initial program load (IPL) separately, has its own copy of its operating system, has its own operator console (if needed), and so forth. If the system in one LPAR crashes, there is no effect on the other LPARs.

The system 300 further includes an OS provisioning system 310 that deploys an instance of an OS on the partitions 321a-c. Although the OS provisioning system 310 is depicted as a separate block from the computer server 320, in one or more examples, the OS provisioning system 310 is part of the server computer 320 itself. For example, the OS provisioning system 310 can be a computer program product that includes one or more computer-executable instructions that are executed by one or more processors in the server computer 310.

The OS provisioning system 310 includes a user interface 312 that allows administrators to deploy and un-deploy OS from the partitions 321a-c of the administrator's choosing. The OS provisioning system 310 can facilitate new or existing customers to deploy and/or un-deploy multiple new partitions on the server computer 320.

Figure 4:
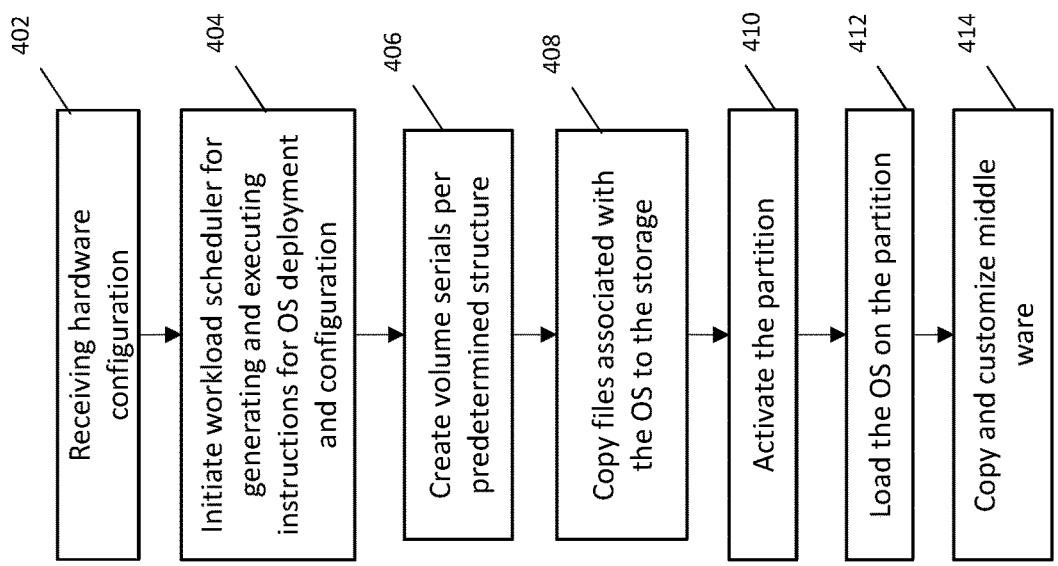
FIG. 4 depicts a flowchart of a method for automatic configuration of an instance of an operating system for a computer server according to one or more embodiments of the present invention.

FIG. 4 depicts a flowchart of a method for automatic configuration of an instance of an operating system for a computer server according to one or more embodiments of the present invention. Configuring the operating system for the computer server 320 can include deployment and/or un-deployment of the instance of the operating system. The instance of the operating system can be associated with a logical partition 321a-c. The method can be invoked via the user interface 312 of the OS provisioning system 310.

It is understood that although the examples herein describe deploying/un-deploying the instance of the OS from the partition 321a, in other embodiments of the present invention, any of the partitions can be used.

The method includes receiving hardware configuration of the logical partition 321a, at block 402. The hardware configuration can include an input/output configuration data set (IOCDS). The IOCDS can be provided via a hardware configuration dialog (HCD). The IOCDS provides where the available storage is located as well as access rights associated with the storage for the partition 321a.

In one or more embodiments of the present invention, the storage associated with the partition 321a is direct access storage device (DASD), which can be an extended count key data (ECKD™) or a count key data (CKD) type of storage device. The DASD is divided into units known as volumes. Volumes divide into fixed-size tracks, and the track's geometry determines its size. A volume can be referenced by using either a device number or a six-character volume serial number (referred to as a volser). In one or more examples, more than one operating system can access a volume at the same time. A volume can have a different device number for each operating system that has access to it, but only one volser. Some operating systems such as Linux allow multiple volumes to have the same volume serial number, while the operating system z/OS® allows only one volume per instance of z/OS® to have the same volume serial number.

The method uses a second (single) partition 321b to be defined as a "service machine." The service machine partition 321b is used to coordinate work to the target partition 321a that is to be provisioned. The service machine partition 321b accesses the target partition's 321a ECKD storage. In one or more embodiments of the present invention, the target partition 321a is prevented from having access to the service machine partition 321b. This one-way direction of authority prevents access from provisioned partition 321a to the service machine partition 321b.

A system administrator can invoke the provisioning process via the service machine partition 321b with a selection screen. The system administrator can specify the target partition 321a, a level of the operating system, and the middleware to provision on the target provision 321a. The system administrator can subsequently invoke the deployment via the user interface 312 using a predetermined user interaction, such as "hit enter". During the invocation, the method facilitates the system administrator to provide input parameters for selecting which version of OS to provision, selecting middleware to provision, selecting a partition image name to provision (LPA1, LPA2, LPAx, etc.). Different partition image names correspond to different types of partitions that have already been deployed and include different settings for middleware, OS, and other software that is included in that partition.

Once the process is invoked, automation is initiated that configures the operating system instance, such as that of z/OS®, on the target partition 321a. In one or more examples, the automation is invoked using a workload scheduler, such as a TIVOLI® workload scheduler, that generates and executes job control language (JCL) steps to perform various actions, at block 404.

The method also includes establishing ECKD DASD and initializing the storage to dynamic naming conventions. This creates volume serials (volsers) with a structured naming convention for a pre-defined architecture setup, at block 406. The naming convention uses a scheme that permits different types of logical partitions to be deployed, for example, according to a predetermined list of types of logical partitions deployed. The number of partitions that can be handled in this manner can vary from one example to another.

Once ECKD DASD is initialized, the method includes copying and customizing the OS data sets from the service machine's 321b ECKD DASD to the target partition's 321a ECKD DASD, at block 408. The customizing can include changing configuration settings according to one or more parameters provided by the administrator when invoking the method. For example, provisioning the OS can include automatically creating a new operating system boot module (RES pack) from a vanilla staging RES pack. The OS provisioning can further include automatically customizing the various OS components (e.g., PARMLIB, etc.) for this specific partition type that is selected (using partition name). Further, customizing the OS can include automatically causing the initial program load (IPL) to start on the new OS instance on the target partition 321a via base control program internal interface (BCPII). In one or more examples, the workload scheduler, such as the Tivoli® Workload Scheduler (TWS) is started on the target partition 321a after the IPL.

The automation continues through BCPII and automatically activates the target partition 321a, at block 410. The image profile is established for all possible partitions prior to provisioning the target partition 321a. This prevents any further manual intervention throughout the provisioning process.

After activation of the target partition 321a, the OS (e.g., z/OS®) is loaded through BCPII commands on the target partition 321a, at block 412. The OS is loaded using the IPL. This is what makes the OS operable for performing further tasks via the target partition 321a. At this time, a fully functional OS base operating system is active. Using a system caller procedure of the OS further tasks are started to bring up the system essentials required for logon and middleware installation. For example, on z/OS® such steps for system automation can be performed via PARMLIB (COMMNDxx) member.

The OS provisioning system 310 provides a notification to the system administrator of completion of the OS instance via the user interface 312 at this time, in one or more examples.

The method further includes, after copying the OS data sets, copying middleware and customizing the middleware data sets as specified by the system administrator, at block 414. The middleware provisioning occurs after the IPL is complete. The middleware provisioning includes automatically installing the middleware selected by the administrator. In one or more examples, the method includes automatically logging in to an account using default/predetermined login credentials for accessing customization options of one of the middleware being installed. In one or more examples, the login credentials may be provided by the system administrator, either during an invocation of the method or via the user interface 312, on-demand. The method further includes automatically starting sub-systems and activating address spaces corresponding to the middleware and/or other applications. The method also includes, in one or more examples, signaling the system administrator with provisioning status via the user interface 312.

For example, the TWA executes a series of applications consisting of groups of JCL jobs to configure and install various middleware such as DB2®, CICS®, WebSphere® Application Server, IBM Open Data Analytics for z/OS® (IzODA), Message Broker, etc. Other middleware can be added to provisioning by a system administrator.

After all the middleware is successfully configured, an automatic notification is sent back to the OS provisioning system 310 to provide feedback to the system administrator via the user interface 312.

Figure 5:
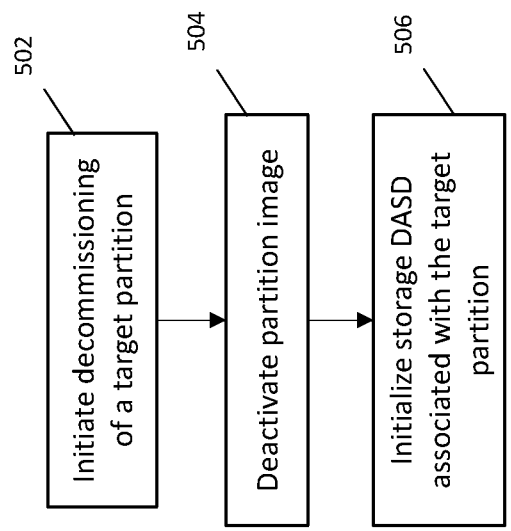
FIG. 5 depicts a flowchart for a method for automatically decommissioning to remove a partition from a computer server according to one or more embodiments.

FIG. 5 depicts a flowchart for a method for decommissioning automatically to remove a partition according to one or more embodiments. Decommissioning, or un-deploying a partition can include initiating the decommissioning via the user interface 312, at block 502. The system administrator specifies the target partition 321a that is to be decommissioned. The method includes automatically deactivating the partition image, via BCPII, of the target partition 321a, at block 504. The deactivating can be initiated by the system administrator using a command via a user interface similar to initiating the deployment of the partition.

Further, the method includes automatically initializing the ECKD DASD for the target partition 321a, at block 506. Here, initializing includes erasing physical data from the ECKD DASD so that the ECKD DASD can be reused at a later time.

In one or more examples, the method includes signaling, via the user interface 312, the system administrator with de-provisioning status.

Accordingly, one or more embodiments of the present invention facilitate deploying and un-deploy a fully functioning operating system automatically. Multiple fully functional OS partitions with functioning middleware can be deployed and ready for use in a relatively short time (e.g., 4 hours) with negligible manual intervention from the administrators, (e.g. 5 minutes of initial input parameters). A user-interface allows administrators to deploy and un-deploy partition OS of their choosing. One or more embodiments of the present invention accordingly address the technical challenge with deploying/un-deploying OS partitions by providing solutions to automatically deploy operational partitions, such as z/OS® logical partitions. One or more embodiments of the present invention further facilitate the automatic deployment of middleware, such as but not limited to, DB2®, CICS®, WebSphere® Application Server, IBM Open Data Analytics for z/OS® (IzODA), etc. One or more embodiments of the present invention also facilitate automatic un-deployment of an existing partition.

The technical problems described herein regarding deploying and un-deploying partitions on/from a computer server are labor intensive and existing solutions require 50+ hours to complete. Embodiments of the present invention accomplish this in a much shorter duration, e.g., 4 hours. Embodiments of the present invention accordingly provide practical applications and improvements in the technical field of computing technology, and particularly computer servers.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
automatically deploying, by a processor, a first logical partition in a computer server, the deploying comprising:
initiating, by the processor, a second logical partition in the computer server as a service machine, wherein the first logical partition is prevented from accessing the second logical partition;
providing, by the processor, the second logical partition a selection of a partition architecture to be deployed on the first logical partition, the partition architecture comprising an identification of an operating system, and one or more parameter values to configure the first logical partition;
receiving, by the processor, an address of storage associated with the first logical partition;
creating, by the processor, on the storage, volume serials with a predetermined naming structure, wherein one or more volumes are created in the first logical partition according to the partition architecture and each volume is assigned a unique volume serial that is dynamically generated based on the predetermined naming structure using the one or more parameter values;
copying, by the processor, files associated with the operating system to the storage based on the volume serials created, the files are copied from the second logical partition to the first logical partition;
customizing, by the processor, configuration settings associated with the operating system according to the one or more parameter values; and
activating, by the processor, the first logical partition and the operating system using a base control program internal interface by using the unique volume serials that are dynamically generated as attributes.

2. The computer-implemented method of claim 1, the deploying further comprising initiating a workload scheduler after activating the first logical partition.

3. The computer-implemented method of claim 2, the deploying further comprising installing, by the processor, one or more middleware applications on the operating system.

4. The computer-implemented method of claim 3, the deploying further comprising:
configuring, by the workload scheduler, the one or more middleware applications by logging on to the one or more middleware applications using corresponding login credentials; and
starting, by the workload scheduler, instances of the one or more middleware applications.

5. The computer-implemented method of claim 3, wherein installing the one or more middleware applications comprises activating one or more address spaces for each of the one or more middleware applications.

6. The computer-implemented method of claim 1, further comprising:
automatically un-deploying, by the processor, the first logical partition, the un-deploying comprising:
deactivating, by the processor, the first logical partition and the operating system using the base control program internal interface; and
initializing the storage associated with the first logical partition to an extended count key data based direct access storage disk.

7. The computer-implemented method of claim 1, further comprising initiating a hardware management console profile for the first logical partition.

8. A system comprising:
a memory; and
a processor communicatively coupled with the memory, the processor configured to perform a method for configuring a computer server, the method comprising:
automatically deploying a first logical partition in the computer server, the deploying comprising:
initiating, by the processor, a second logical partition in the computer server as a service machine, wherein the first logical partition is prevented from accessing the second logical partition;
providing the second logical partition a selection of a partition architecture to be deployed on the first logical partition, the partition architecture comprising an identification of an operating system, and one or more parameter values to configure the first logical partition;
receiving an address of storage associated with the first logical partition;
creating on the storage, volume serials with a predetermined structured naming structure, wherein one or more volumes are created in the first logical partition according to the partition architecture and each volume is assigned a unique volume serial that is dynamically generated based on the predetermined naming structure using the one or more parameter values;
copying files associated with the operating system to the volume serials in the storage, the files are copied from the second logical partition to the first logical partition
customizing configuration settings associated with the operating system according to the one or more parameter values; and
activating the first logical partition and the operating system using a base control program internal interface by using the unique volume serials that are dynamically generated as attributes.

9. The system of claim 8, the deploying further comprising initiating a workload scheduler after activating the first logical partition.

10. The system of claim 9, the deploying further comprising installing, by the processor, one or more middleware applications on the operating system.

11. The system of claim 10, the deploying further comprising:
configuring, by the workload scheduler, the one or more middleware applications by logging on to the one or more middleware applications using corresponding login credentials; and
starting, by the workload scheduler, instances of the one or more middleware applications.

12. The system of claim 10, wherein installing the one or more middleware applications comprises activating one or more address spaces for each of the one or more middleware applications.

13. The system of claim 8, wherein the processor is further configured to:
automatically un-deploying the first logical partition, the un-deploying comprising:
deactivating the first logical partition and the operating system using the base control program internal interface; and
initializing the storage associated with the first logical partition to an extended count key data based direct access storage disk.

14. The system of claim 8, wherein the processor is further configured to initiate a hardware management console profile for the first logical partition.

15. A computer program product comprising a computer-readable memory that has computer-executable instructions stored thereupon, wherein the computer-executable instructions when executed by a processor cause the processor to perform a method for configuring a computer server, the method comprising:
automatically deploying a first logical partition in the computer server, the deploying comprising:
initiating a second logical partition in the computer server as a service machine, wherein the first logical partition is prevented from accessing the second logical partition;
providing the second logical partition a selection of a partition architecture to be deployed on the first logical partition, the partition architecture comprising an identification of an operating system, and one or more parameter values to configure the first logical partition;
receiving an address of storage associated with the first logical partition;
creating on the storage, volume serials with a predetermined structured naming, wherein one or more volumes are created in the first logical partition according to the partition architecture and each volume is assigned a unique volume serial that is dynamically generated based on the predetermined naming structure using the one or more parameter values;
copying files associated with the operating system to the volume serials in the storage, the files are copied from the second logical partition to the first logical partition;
customizing configuration settings associated with the operating system according to the one or more parameter values; and
activating the first logical partition and the operating system using a base control program internal interface by using the unique volume serials that are dynamically generated as attributes.

16. The computer program product of claim 15, the deploying further comprising initiating a workload scheduler after activating the first logical partition.

17. The computer program product of claim 16, the deploying further comprising installing, one or more middleware applications on the operating system.

18. The computer program product of claim 17, the deploying further comprising:

configuring, by the workload scheduler, the one or more middleware applications by logging on to the one or more middleware applications using corresponding login credentials; and starting, by the workload scheduler, instances of the one or more middleware applications.

19. The computer program product of claim 18, wherein installing the one or more middleware applications comprises activating one or more address spaces for each of the one or more middleware applications.

20. The computer program product of claim 15, wherein the method further comprises:

automatically un-deploying the first logical partition, the un-deploying comprising:

deactivating the first logical partition and the operating system using the base control program internal interface; and initializing the storage associated with the first logical partition to an extended count key data based direct access storage disk.

\* \* \* \* \*